United States Patent
Yamamoto (10) Patent No.: US 9,410,607 B2
(45) Date of Patent: Aug. 9, 2016

(54) PULLEY UNIT

(71) Applicant: JTEKT CORPORATION, Osaka-shi, Osaka (JP)

(72) Inventor: Ikuo Yamamoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 103 days.

(21) Appl. No.: 14/577,553

(22) Filed: Dec. 19, 2014

(65) Prior Publication Data

US 2015/0192196 A1 Jul. 9, 2015

(30) Foreign Application Priority Data

Jan. 9, 2014 (JP) ................. 2014-002314

(51) Int. Cl.
| B62J 13/00 | (2006.01) |
| F16D 1/00 | (2006.01) |
| F16H 57/02 | (2012.01) |
| F16H 55/36 | (2006.01) |
| H02K 7/10 | (2006.01) |
| F16D 41/06 | (2006.01) |
| H02K 5/10 | (2006.01) |

(52) U.S. Cl.
CPC ............... *F16H 55/36* (2013.01); *F16D 41/06* (2013.01); *H02K 5/10* (2013.01); *H02K 7/1004* (2013.01)

(58) Field of Classification Search
CPC . F16H 55/36; F16H 2055/366; F16D 41/206; F02B 67/06; F16C 13/006
USPC .............................................. 474/70, 94, 144
See application file for complete search history.

(56) References Cited

U.S. PATENT DOCUMENTS

| 6,083,130 | A * | 7/2000 | Mevissen | F02B 67/06 192/107 T |
| 6,237,736 | B1 * | 5/2001 | Ouchi | F16D 41/064 192/41 R |
| 6,676,548 | B2 * | 1/2004 | Fujiwara | F16H 7/20 192/41 R |
| 7,011,593 | B2 * | 3/2006 | Schenk | F16C 13/006 384/477 |
| 7,056,247 | B2 * | 6/2006 | Fujiwara | F16D 41/067 474/166 |
| 7,182,707 | B2 * | 2/2007 | Nakamura | F02B 67/06 290/4 C |
| 7,201,685 | B2 * | 4/2007 | Terada | F16C 33/7853 384/486 |
| 7,618,337 | B2 * | 11/2009 | Jansen | F02B 67/06 192/41 S |
| 7,909,717 | B2 * | 3/2011 | Boussaguet | F16C 13/006 474/136 |
| 7,975,821 | B2 * | 7/2011 | Antchak | F16D 7/022 192/41 S |
| 8,012,053 | B2 * | 9/2011 | Filip | F16C 13/006 474/144 |

(Continued)

FOREIGN PATENT DOCUMENTS

JP        A-2003-232434        8/2003

*Primary Examiner* — Henry Liu
(74) *Attorney, Agent, or Firm* — Oliff PLC (57) ABSTRACT

A pulley unit having a sleeve, a pulley and a cap member, wherein the cap member has an annular portion extending from a cover portion in an axial direction and fitted into a hexagon socket portion (polygonal inner peripheral portion), claw portions are formed to extend from the annular portion in the axial direction, and a peripheral surface of the annular portion is provided with first plane portions facing surfaces of the hexagon socket portion.

18 Claims, 6 Drawing Sheets

(56) References Cited

U.S. PATENT DOCUMENTS

| | | | | |
|---|---|---|---|---|
| 8,192,312 B2* | 6/2012 | Ali | F16F 15/121 | 474/94 |
| 8,292,766 B2* | 10/2012 | Cali | F16D 3/02 | 192/70.14 |
| 8,651,988 B2* | 2/2014 | Kapfer | F16C 13/006 | 474/101 |
| 8,715,121 B2* | 5/2014 | Cali | F16D 3/02 | 474/94 |
| 8,820,503 B2* | 9/2014 | Schneider | F16D 41/206 | 192/41 S |
| 8,888,619 B2* | 11/2014 | Antchak | F16D 7/022 | 474/74 |
| 8,888,622 B2* | 11/2014 | Chen | F16D 41/206 | 474/74 |
| 2002/0060117 A1* | 5/2002 | Nakamura | F16D 41/067 | 192/45.018 |
| 2002/0183147 A1* | 12/2002 | Fujiwara | F16H 55/36 | 474/70 |
| 2005/0026729 A1* | 2/2005 | Schenk | F16C 13/006 | 474/101 |
| 2005/0250607 A1* | 11/2005 | Jansen | F02B 67/06 | 474/74 |
| 2006/0122014 A1* | 6/2006 | Kamdem | F16D 3/02 | 474/70 |
| 2007/0072714 A1* | 3/2007 | Filip | F16C 13/006 | 474/144 |
| 2009/0176608 A1* | 7/2009 | Jansen | F02B 67/06 | 474/74 |
| 2009/0305828 A1* | 12/2009 | Rasche | F02B 67/06 | 474/94 |
| 2011/0065537 A1* | 3/2011 | Serkh | F16D 7/022 | 474/94 |
| 2011/0070987 A1* | 3/2011 | Swane | B29C 45/14467 | 474/144 |
| 2011/0281678 A1* | 11/2011 | Cali | F16D 3/02 | 474/171 |
| 2012/0088616 A1* | 4/2012 | Ali | F16F 15/121 | 474/94 |
| 2012/0295746 A1* | 11/2012 | Cali | F16D 3/02 | 474/94 |
| 2013/0012346 A1* | 1/2013 | Sugitani | H02K 7/1004 | 474/166 |
| 2013/0059685 A1* | 3/2013 | Cali | F16D 3/68 | 474/91 |
| 2013/0267361 A1* | 10/2013 | Cali | F16D 3/02 | 474/70 |
| 2013/0324335 A1* | 12/2013 | Chen | F16D 41/206 | 474/94 |
| 2014/0364258 A1* | 12/2014 | Lescorail | F16H 55/36 | 474/150 |
| 2015/0252884 A1* | 9/2015 | Serkh | F16H 55/36 | 474/94 |

* cited by examiner

PULLEY UNIT

INCORPORATION BY REFERENCE

The disclosure of Japanese Patent Application No. 2014-002314 filed on Jan. 9, 2014 including the specification, drawings and abstract is incorporated herein by reference in its entirety.

BACKGROUND OF THE INVENTION

1. Field of the Invention

The present invention relates to a pulley unit.

2. Description of the Related Art

Heretofore, there has been known a pulley unit including a one-way clutch and mounted on a rotational shaft of an accessory which is driven by a crankshaft of an engine through a belt in an automobile or the like. Examples of such an accessary include compressors for air conditioners, water pumps, alternators, cooling fans and the like in automobiles. The pulley unit includes a sleeve. The sleeve has a cylindrical shape. The sleeve includes on one side in an axial direction a first opening end portion for insertion of an end portion of a rotational shaft. The sleeve also includes a second opening end portion provided on a side that is opposite from the first opening end portion and having, as an inner periphery, a polygonal inner peripheral portion with a polygonal cross-section. The pulley unit also includes a pulley that is arranged concentrically on a radially outer side of the sleeve to be supported rotatably about the axis of the sleeve, and has an outer peripheral surface on which a belt is wound. The pulley unit also includes a cap member that has a cover portion covering the second opening end portion and claw portions engaged with a stepped attaching portion provided on an inner surface of the sleeve. In the pulley unit, a rotational shaft of an automotive accessory (rotor shaft of an alternator, for example) is inserted into the sleeve on the first opening end portion side, and a mounting jig is fitted in the polygonal inner peripheral portion at the second opening end portion of the sleeve, whereby the pulley unit is fastened and fixed on the rotational shaft (refer to Japanese Patent Application Publication No. 2003-232434 (JP 2003-232434 A) for example).

Such a pulley unit may be arranged at a place in the accessory, which is prone to be splashed with mud water or the like. Thus, the end surface, the inner surface and the like at the second opening end portion of the sleeve are prone to rust. It is generally conceived to give such exposed metal portions a rust prevention treatment. However, for fastening and fixing the pulley unit on a rotational shaft, it is stipulated to perform the tightening with a predetermined tightening torque. It is expected that when the tightening on the rotational shaft is carried out with the inner surface of the sleeve having been provided with coating in the rust prevention treatment, the tightening and fixing with a standard tightening torque becomes difficult. Therefore, in fixing the pulley unit on the rotational shaft of the accessory, the pulley unit is mounted without performing the rust prevention treatment on the sleeve and then, the second opening end portion is covered with the cap member. In the cap member in the aforementioned JP 2003-232434 A, a plurality of claw portions that are engaged with a stepped attaching portion on the inner surface of the sleeve are provided so as to extend from the cover portion covering the second opening end portion.

However, in the cap member in the aforementioned JP 2003-232434 A, because the claw portions are provided separate from one another in the circumferential direction, gaps are formed at respective root parts of the claw portions. Therefore, there is a possibility that mud water entering from an end surface of the sleeve easily enters the interior of the sleeve through the gaps. For this reason, a further improvement has been desired for reducing the entry of water in the cap member.

SUMMARY OF THE INVENTION

One object of the present invention is to provide a pulley unit having a cap member that reduces entry of water.

An aspect of the present invention provides a pulley unit including a sleeve, a pulley, and a cap member. The sleeve has a cylindrical shape, and includes: on one side in an axial direction a first opening end portion for insertion of an end portion of a rotational shaft; and a second opening end portion provided on a side that is opposite from the first opening end portion and having, as an inner periphery, a polygonal inner peripheral portion with a polygonal cross-section. The pulley is concentrically arranged on a radially outer side of the sleeve to be supported rotatably about an axis and has an outer peripheral surface on which a belt is wound. The cap member has a cover portion covering the second opening end portion and claw portions that are engaged with a stepped attaching portion provided on an inner surface of the sleeve. In the pulley unit, the cap member has an annular portion extending from the cover portion in the axial direction and fitted into the polygonal inner peripheral portion, the claw portions are formed to extend from the annular portion in the axial direction, and a peripheral surface of the annular portion is provided with first plane portions facing a surface of the polygonal inner peripheral portion.

BRIEF DESCRIPTION OF THE DRAWINGS

The foregoing and further features and advantages of the invention will become apparent from the following description of an example embodiment with reference to the accompanying drawings, wherein like numerals are used to represent like elements, and wherein:

FIG. 5A is a perspective view of the cap member in the pulley unit according to the embodiment as viewed from a cover portion side, while

DETAILED DESCRIPTION OF EMBODIMENT

Hereafter, an embodiment of the present invention will be described with reference to FIG. 1 through FIG. 8. For description of a pulley unit in the present embodiment, an alternator 90 mounted on an automotive engine is exemplified as an accessory in an automobile or the like, and a pulley unit 10 including a one-way clutch 60 is exemplified as the pulley unit used in the alternator 90.

When the alternator 90 (shown in FIG. 1) that is mounted on the automotive engine is coupled to a crankshaft (not shown) of the engine so as to rotate synchronously with the crankshaft, a decrease in rotational speed of the crankshaft may cause a reduction in power generation capability of the alternator 90 (the details of the entire configuration of the alternator not illustrated). Thus, the pulley unit 10 used in the alternator 90 includes the one-way clutch 60. When the rotational speed of the crankshaft goes down, the rotation of a rotor shaft 92 (rotational shaft) of the alternator 90 is continued by its inertia, which enhances the power generation efficiency. The rotational driving force of the engine is transmitted to the pulley 30 by a belt (not shown). The one-way clutch 60 is interposed between the pulley 30 and a sleeve 20 that is fitted and fixed on the rotor shaft 92 of the alternator 90. That is, the pulley unit 10 is configured to switch the one-way clutch 60 between a lock state (power transmitting state) and a free state (power transmission blocking state) depending on the rotational speed difference between the pulley 30 and the sleeve 20, and the power is transmitted or blocked between the pulley 30 and the sleeve 20. When the one-way clutch 60 is brought into the free state, the sleeve 20 fitted and fixed on the rotor shaft 92 continues the rotation with its own rotational inertia.

Figure 1:
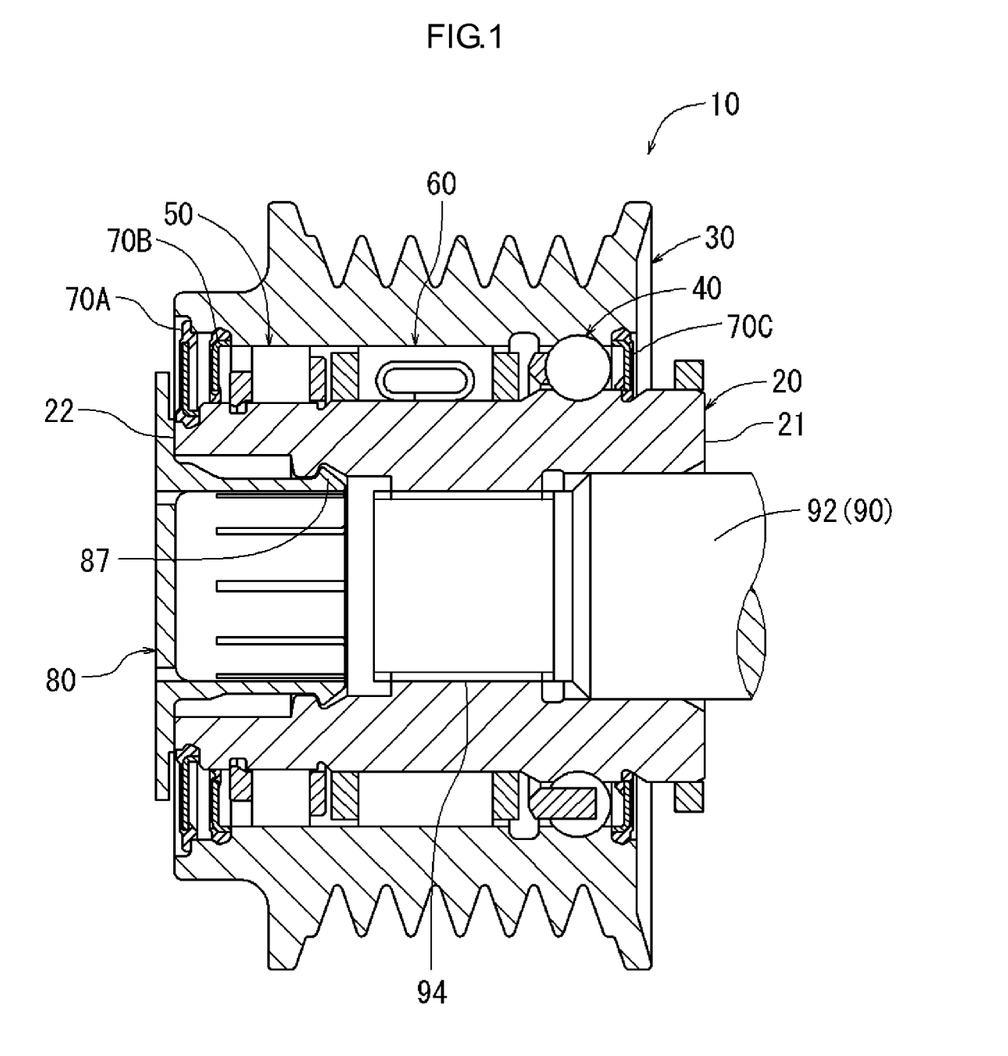
FIG. 1 is a sectional view, taken along an axial direction, of a pulley unit according to an embodiment.

As shown in FIG. 1, the pulley unit 10 includes the sleeve 20, the pulley 30 and a cap member 80. The pulley unit 10 in the present embodiment also includes the one-way clutch 60 and sealing members 70A, 70B, 70C. The pulley unit 10 also includes a ball bearing 40 and a roller bearing 50 serving as the configurations that rotatably support the pulley 30 on the outer periphery of the sleeve 20.

Figure 2:
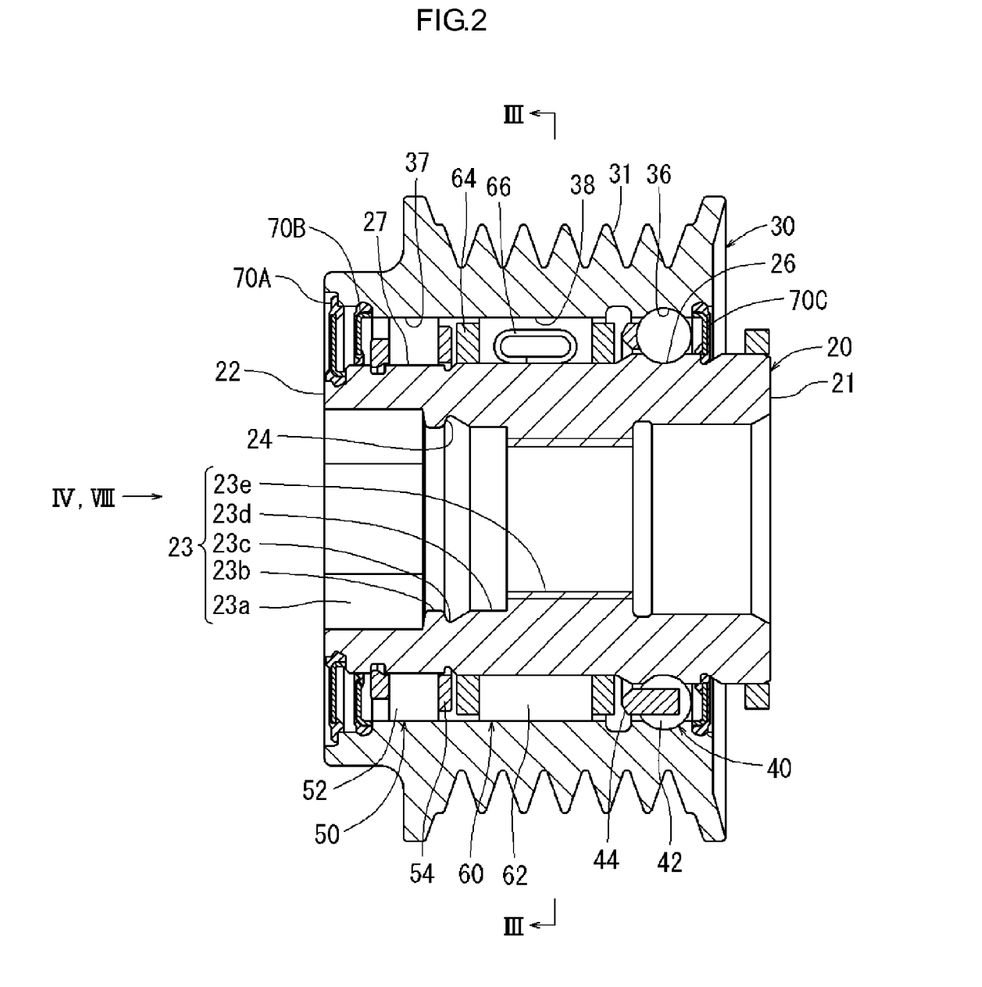
FIG. 2 is a sectional view, taken along the axial direction, of the pulley unit according to the embodiment in the state where a cap member has been detached.

As shown in FIGS. 1 and 2, the sleeve 20 is a member mounted on the rotor shaft 92 (rotational shaft) of the alternator 90. The sleeve 20 has a cylindrical shape, and its inner peripheral surface defines an insertion hole 23 extending in the axial direction. A first opening end portion 21, through which an end portion of the rotor shaft 92 of the alternator 90 is inserted, is provided at one side of the insertion hole 23 of the sleeve 20 in the axial direction. A second opening end portion 22 is provided at a side of the sleeve 20 that is opposite from the first opening end portion 21 in the axial direction (at the other end of the sleeve 20 in the axial direction). An inner periphery of the second opening end portion 22 is formed of a polygonal inner peripheral portion having a polygonal cross-section. In the present embodiment, a hexagon socket portion 23a is formed as the polygonal inner peripheral portion. At an intermediate area of the insertion hole 23, an internal thread portion 23e is provided so as to extend in the axial direction. An outer peripheral surface of the rotor shaft 92 is provided with an external thread portion 94 mating with the internal thread portion 23e, so that the sleeve 20 and the rotor shaft 92 are threadedly engaged with each other. That is, the internal thread portion 23e is used for fastening the sleeve 20 on the external thread portion 94 of the rotor shaft 92 such that the pulley unit 10 is fixedly attached to the alternator 90. In the fastening and fixing, a tool having a hexagonal contour is inserted into a hexagon socket portion 23a, and in this state, the tool is turned in the fastening direction. Further, the insertion hole 23 of the sleeve 20 is provided, between the hexagon socket portion 23a and the internal thread portion 23e, with an attaching portion 24 with which claw portions 87 of the cap member 80 referred to later are engaged. The attaching portion 24 is provided in a stepped manner on an inner surface of the sleeve 20 and is configured to be engaged with the claw portions 87 of the cap member 80. The insertion hole 23 of the sleeve 20 is provided with a first circular inner peripheral portion 23b having a circular cross-section and adjoining the hexagon socket portion 23a (polygonal inner peripheral portion) in the axial direction. The diameter of the first circular inner peripheral portion 23b is formed to be smaller than the diameter of an inscribed circle of the hexagon socket portion 23a. There is provided a second circular inner peripheral portion 23c adjoining the first circular inner peripheral portion 23b in the axial direction and having a circular cross-section larger in diameter than that of the first circular inner peripheral portion 23b. There is provided a third circular inner peripheral portion 23d adjoining the second circular inner peripheral portion 23c in the axial direction and having a circular cross-section smaller in diameter than that of the second circular inner peripheral portion 23c. The internal thread portion 23e, a peripheral surface of which is threadedly engaged with the end portion of the rotor shaft 92, is provided adjoining the third circular inner peripheral portion 23d in the axial direction. The attaching portion 24 is provided as a stepped portion formed at the boundary between the first circular inner peripheral portion 23b and the second circular inner peripheral portion 23c. In the present embodiment, the configuration is exemplified that includes the second circular inner peripheral portion 23c and the third circular inner peripheral portion 23d. However, a configuration that does not include the third circular inner peripheral portion 23d may be adopted, so long as the second circular inner peripheral portion 23c is lager in diameter than the first circular inner peripheral portion 23b and the stepped attaching portion 24 is formed at the boundary between the first circular inner peripheral portion 23b and the second circular inner peripheral portion 23c.

As shown in FIG. 2, the pulley 30 is a member that is arranged concentrically on the radially outer side of the sleeve 20 to be supported rotatably about the axis of the sleeve 20, and is configured such that a belt is wound an outer peripheral surface. The pulley 30 takes the shape of a hollow cylinder. The outer peripheral surface of the pulley 30 includes a generally wavy groove portion 31 in which ridges and grooves alternately adjoin continuously in the outer periphery as viewed in a longitudinal section. An inner peripheral surface 38 of the pulley 30 has a cylindrical shape. The pulley 30 is arranged concentrically with the sleeve 20, and the pulley 30 is rotatably supported by the roller bearing 50 and the ball bearing 40 interposed between the pulley 30 and the sleeve 20.

The ball bearing 40 is arranged on the outer periphery at the first opening end portion 21 (on the alternator 90 side) of the sleeve 20, as shown in FIG. 2. The ball bearing 40 has a plurality of balls 42 and a cage 44 on the outer peripheral surface of the sleeve 20. The cage 44 keeps the circumferential intervals of the balls 42 constant. In the present embodiment, a raceway groove 26 and a raceway groove 36 are provided as the raceway grooves on which the balls 42 roll. The raceway groove 26 is a concave groove that circumferentially extends on the outer peripheral surface of the sleeve 20. The raceway groove 36 is a concave groove that circumferentially extends on the inner peripheral surface of the pulley 30. That is, the sleeve 20 serves as an inner ring for the balls 42, while the pulley 30 serves as an outer ring for the balls 42. The raceway grooves 26, 36 for the balls 42 are not limited to those provided on the outer peripheral surface of the sleeve 20 and the inner peripheral surface of the pulley 30.

The ball bearing 40 may have its own outer ring and inner ring discretely and be interposed between the sleeve 20 and the pulley 30.

The roller bearing 50 is arranged on an outer periphery at the second opening end portion 22 (on the side opposite from the alternator 90 side) of the sleeve 20, as shown in FIG. 2. The roller bearing 50 includes a plurality of rollers 52 having a cylindrical shape and a cage 54. The cage 54 keeps the circumferential intervals of the plurality of rollers 52 constant and restricts the positions thereof in the axial direction. In the present embodiment, raceway surfaces on which the rollers 52 roll are constituted by a raceway surface 27 on the outer peripheral surface of the sleeve 20 and a raceway surface 37 on the inner peripheral surface of the pulley 30. That is, the sleeve 20 serves as an inner ring for the rollers 52, while the pulley 30 serves as an outer ring for the rollers 52. The raceway surfaces 27, 37 are not limited to those provided on the outer peripheral surface of the sleeve 20 and the inner peripheral surface of the pulley 30. The roller bearing 50 may have its own outer ring and inner ring discretely and be interposed between the sleeve 20 and the pulley 30.

Figure 3:
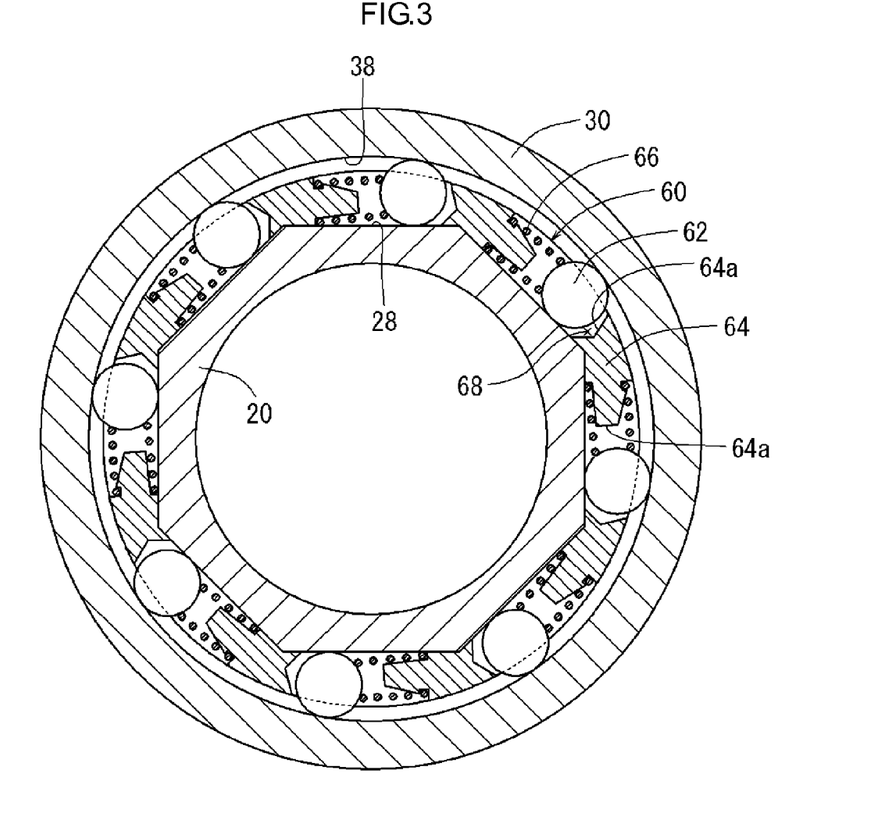
FIG. 3 is a sectional view taken along the line III-III in FIG. 2.
Figure 4:
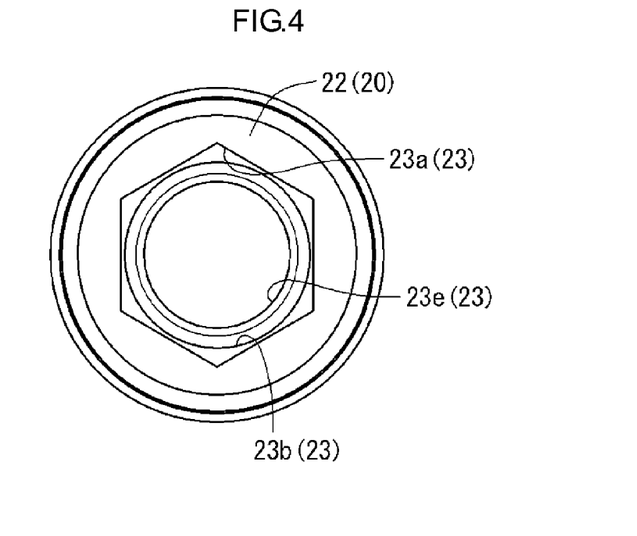
FIG. 4 is a view showing a second opening end portion of the pulley unit according to the embodiment as viewed in the direction IV in FIG. 2.
Figure 5A:
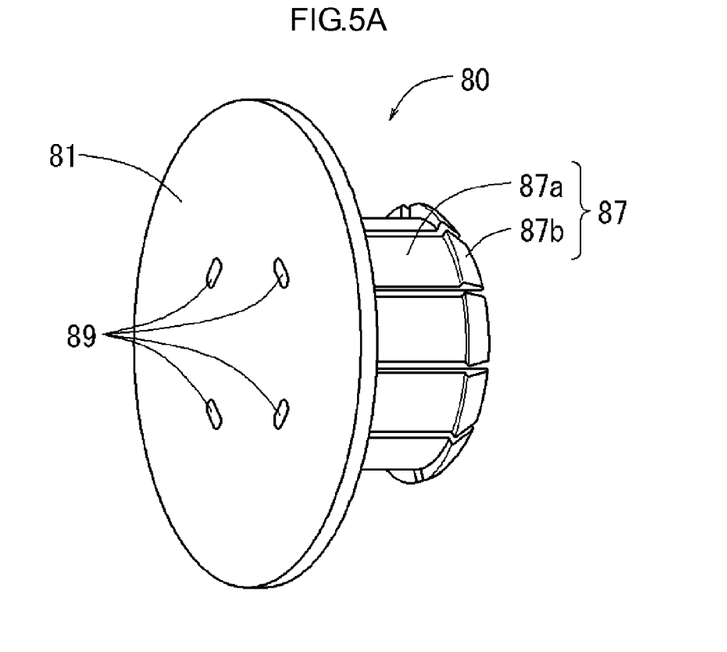
Figure 5B:
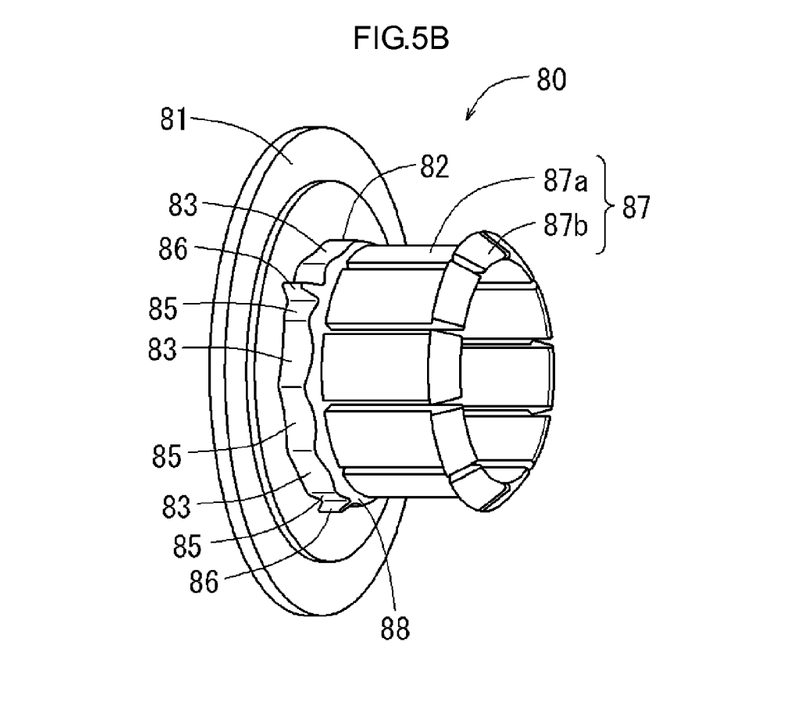
FIG. 5B is a perspective view of the cap member in the pulley unit according to the embodiment as viewed from a claw portion side.
Figure 6:
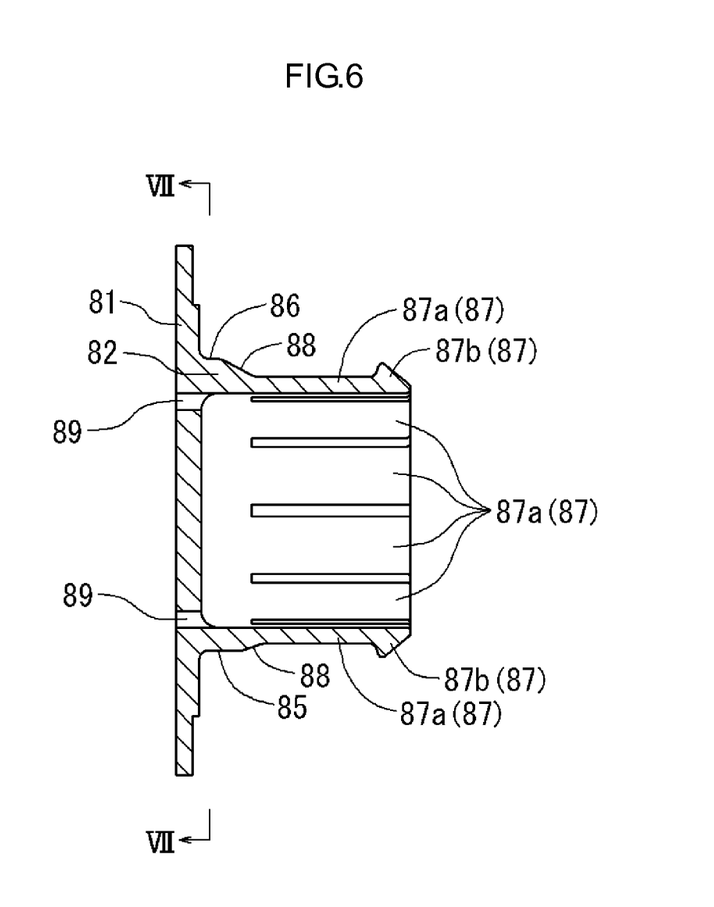
FIG. 6 is a sectional view taken along an axial direction of the cap member in the pulley unit according to the embodiment.
Figure 7:
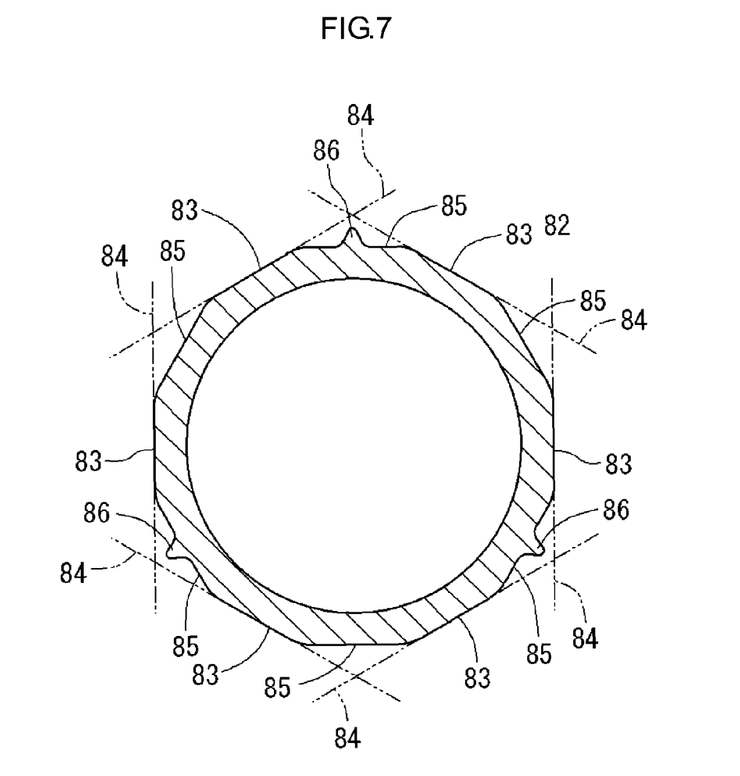
FIG. 7 is a sectional view taken along the line VII-VII in FIG. 6.

The one-way clutch 60 is arranged between the sleeve 20 and the pulley 30 and is interposed between the ball bearing 40 and the roller bearing 50 in the axial direction, as shown in FIG. 2. As shown in FIG. 3, the one-way clutch 60 includes a plurality of cylindrical rollers 62, a cage 64 and elastic members 66. The cage 64 restricts the circumferential positions and the axial positions of the rollers 62. The elastic members 66 are each provided for corresponding one of the rollers 62. The outer peripheral surface of the sleeve 20 radially facing the one-way clutch 60 has a cam surface 28 with a regular polygon cross-section and in the present embodiment, has the cam surface 28 with a regular octagon cross-section. Between the cam surface 28 of the sleeve 20 and the cylindrical inner peripheral surface 38 of the pulley 30, wedge-shaped spaces 68 are formed at eight places in the circumferential direction. At each of these wedge-shaped spaces 68, one roller 62 and one elastic member 66 are received in a pocket 64a of the cage 64. The elastic members 66 elastically urge the rollers 62 toward respective narrow sides (lock sides) of the wedge-shaped spaces 68 which are defined by the cam surface 28 of the sleeve 20 and the inner peripheral surface 38 of the pulley 30. Various members such as leaf springs, coil springs and the like are applicable as the elastic members 66. Although as the one-way clutch 60, one is exemplified whose inner ring is constituted by the outer peripheral surface of the sleeve and whose outer ring is constituted by the inner peripheral surface of the pulley, the one-way clutch 60 may have its own outer ring and inner ring discretely and be interposed between the sleeve 20 and the pulley 30. Further, although the wedge-shaped spaces 68 are exemplified as those configured by the sleeve having a regular octagon cross-section, the number of cam surfaces is not limited and thus, a sleeve having a regular polygon cross-section other than the regular octagon cross-section may be used. Further, the wedge-shaped spaces may be of any shape as long as the distance between the inner ring and the outer ring decreases in the circumferential direction. Further, the cam surfaces may be formed on the outer ring side, rather than the inner ring side.

In the operation of the one-way clutch 60, when the pulley 30 is rotated in one direction as shown in FIGS. 2 and 3 with a rotational speed of the pulley 30 being equal to or faster than the rotational speed of the sleeve 20, the positions of the rollers 62 are each fixed at the narrow side (lock side) in the wedge-shaped space 68, so that the pulley 30 and the sleeve 20 are brought into an engaged state. This state is a lock state (power transmitting state) in which the rotational driving force from the crankshaft of the engine (not shown) is transmitted to the pulley 30 to transmit the rotational driving force to the sleeve 20, so that the rotor shaft 92 of the alternator 90 is rotated by the rotational driving force.

When the rotational speed of the crankshaft decreases with a decrease in the rotational speed of the engine in the lock state (power transmitting state), the rotational speed of the pulley 30 also decreases. However, the rotational inertia force of the rotor shaft 92 suppresses an immediate reduction in the rotational speed of the sleeve 20 such that the sleeve 20 maintains its rotational speed. This results in moving of the position of each the roller 62 in the circumferential direction from the narrow side (lock side) in the wedge-shaped space 68 against the elastic force of the elastic member 66, whereby the engaged state between the pulley 30 and the sleeve 20 is released. Thus, the rotor shaft 92 does not immediately decrease in rotational speed with the pulley 30, and the rotor shaft 92 decreases in rotational speed more slowly than the pulley 30. This state is a free state (power transmission blocking state).

As shown in FIG. 2, the sealing members 70A, 70B, 70C formed by attaching elastic bodies such as rubber or synthetic resin to annular members made of metal are press-fitted and fixed between the sleeve 20 and the pulley 30 to seal the annular space between the sleeve 20 and the pulley 30. Although in the present embodiment, a configuration is exemplified in which the sealing members 70A, 70B are provided on the second opening end portion 22 side and the sealing member 70C is provided on the first opening end portion 21 side, the configuration is not limited to this. The sealing members may be suitably altered in shape, number and the like, taking into account a state in which the pulley unit 10 is assumed to be splashed with mud water.

As shown in FIGS. 1, 2 and 4 to 7, the cap member 80 is a member that covers the second opening end portion 22 of the sleeve 20. The cap member 80 is made of synthetic resin, anticorrosive metal or the like. In the present embodiment, the cap member 80 made of synthetic resin is used. The cap member 80 has a cover portion 81, an annular portion 82 and the claw portions 87 that are formed integrally. The cover portion 81 is a disc-like section for covering the second opening end portion 22. The cover portion 81 is provided with a plurality of communication holes 89 passing therethrough in the thickness direction. The communication holes 89 are provided for draining water, water vapor or the like that would enter the sleeve 20. Although the cap member 80 in the present embodiment is provided with the communication holes 89, there may be taken a configuration that is not provided with the communication holes 89. Further, the annular portion 82 is a section that axially extends from the cover portion 81 and is fitted in the hexagon socket portion 23a (polygonal inner peripheral portion). Other than one having a continuous annular shape, the annular portion 82 encompasses one having an annular shape that is not continuous along the whole circumference so long as it has a circular annular shape. The peripheral surface of the annular portion 82 in the present embodiment has a regular dodecagon cross-section. The peripheral surface of the annular portion 82 is formed by first plane portions 83 and second plane portions 85 arranged alternately in the circumferential direction. The first plane portions 83 face surfaces of the hexagon socket portion 23a. The second plane portions 85 adjoin the first plane portions 83. Each of the second plane portions 85 is formed by bending radially inward the peripheral surface adjoining the first plane portion 83 at the boundary with the first plane portion 83 such that the second plane portion 85 extends in a direction that intersects a surface of the hexagon socket portion 23a. In other words, in the peripheral surface of the annular portion 82, one first plane portion 83 is arranged at one end of each second plane portion 85 and one first plane portion 83 is arranged at the other end of the second plane portion 85 in the circumferential direction. The second plane portions 85 are provided with at least one protrusion 86 extending radially outward therefrom. In the present embodiment, three protrusions 86 are arranged at regular intervals in the circumferential direction. In each second plane portion 85 with the protrusion 86, the protrusion 86 is provided at a triangle area that is surrounded by two planes formed of imaginary planes 84 extended to a mutually intersecting position and the second plane portion 85. Herein, the imaginary planes 84 are assumed to be the planes respectively extending along the first plane portions 83 located at opposite ends of each second plane portion 85. That is, the shape of the area surrounded by the imaginary planes 84 that respectively extend along six first plane portions 83 formed in the annular portion 82 closely resembles to the shape of the hexagon socket portion 23a. Because each protrusion 86 is provided at the area surrounded by the adjoining imaginary planes 84 and the second plane portion 85, each protrusion 86 is provided at such a position that it does not interfere with the hexagon socket portion 23a of the sleeve 20.

Figure 8:
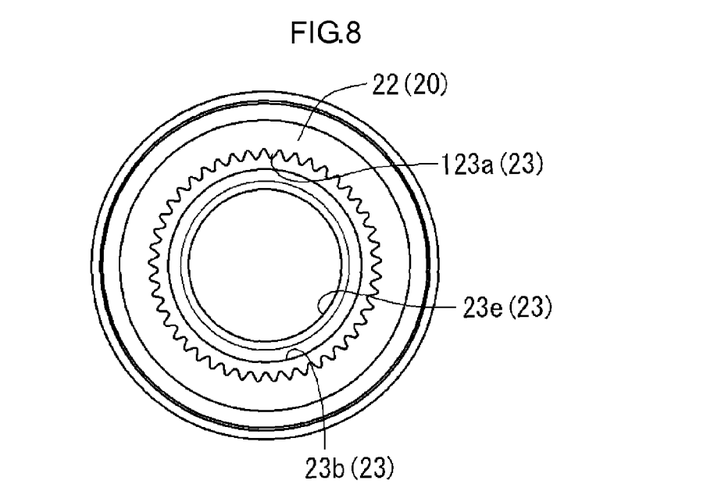
FIG. 8 is a view showing a modification of the second opening end portion in the pulley unit according to the embodiment as viewed in the direction VIII in FIG. 2.

The inner peripheral shape of the second opening end portion 22 of the sleeve 20 is not limited to the regular hexagon of the hexagon socket portion 23a (refer to FIG. 4), and the inner periphery of the second opening end portion 22 may be formed of a so-called serration socket portion 123a having ridges and grooves that adjoin continuously, as shown in FIG. 8. For this reason, the protrusions 86 are provided so as to be engaged with the groove section of the serration socket portion 123a. It is desirable that the protrusions 86 be formed to taper off as they protrude radially outward, in order to facilitate the engagement between the protrusions 86 and the valley-shaped sections of the serration socket portion 123a.

The claw portions 87 extend in the axial direction from the annular portion 82 and are engaged with the stepped attaching portion 24 provided on the inner surface of the sleeve 20. The claw portions 87 each have a plate-like connection portion 87a and a hook portion 87b that is provided at a distal end of the connection portion 87a so as to be engaged with the attaching portion 24. The connection portion 87a extends from the annular portion 82 in the axial direction. The hook portion 87b at the distal end of the connection portion 87a is engaged with the attaching portion 24. The hook portion 87b takes the shape of a hook that projects radially outward from the distal end of connection portion 87a. Since the claw portions 87 axially extend from the annular portion 82, the length of the connection portions 87a arranged in a cylindrical shape can be reduced by the length of the annular portion 82. Further, the thickness of the annular portion 82 in the radial direction is larger than the thickness of the connection portions 87a in the radial direction. Further, a section connecting the annular portion 82 with the connection portions 87a of the claw portions 87 is provided with a tapered surface 88 gently tilted radially outward as it extends from the connection portions 87a toward the annular portion 82. Various numbers of the claw portions 87 can be adopted so long as they are two or more.

As described above, according to the pulley unit 10 in the present embodiment, the cap member 80 has the annular portion 82 that axially extends from the cover portion 81 and that is fitted into the hexagon socket portion 23a (polygonal inner peripheral portion). Thus, the annular portion 82 can block water that enters along the end surface of the second opening end portion 22 of the sleeve 20. Further, since the peripheral surface of the annular portion 82 is provided with the first plane portions 83 that face surfaces of the hexagon socket portion 23a at the second opening end portion 22, gaps between the annular portion 82 and the hexagon socket portion 23a can be reduced. This makes it possible to restrain water from entering the interior of the sleeve 20. Consequently, it is possible to provide the pulley unit 10 having the cap member 80 capable of restraining entry of water.

Further, in addition to the first plane portions 83 adapted to the hexagon socket portion 23a at the inner periphery of the second opening end portion 22 of the sleeve 20, the second plane portions 85 are provided for adaptation to another shape of the inner peripheral portion. This allows the cap member 80 to be attached to the inner periphery of the second opening end portion 22 of the sleeve 20 of at least two kinds. Moreover, because the second plane portions 85 are provided with at least one protrusion 86 that extends radially outward from the second plane portions 85, it is possible to position the cap member 80 in the circumferential direction and to suppress the turn in the circumferential direction. Further, it is desirable to provide the protrusion 86 at the area surrounded by the second plane portion 85 and the two imaginary planes 84 that extend along the first plane portions 83 located at the opposite ends of the second plane portion 85. The protrusion 86 provided on the annular portion 82 can avoid interference when the annular portion 82 is fitted into the hexagon socket portion 23a that face the first plane portions 83 and can be adapted to another shape of the inner peripheral portion. Further, the thickness of the annular portion 82 in the radial direction is larger than the thickness of the claw portions 87 in the radial direction. The annular portion 82 is arranged between the cover portion 81 and the claw portions 87. This is desirable for securing rigidity of the cap member 80 while reducing the weight thereof. Furthermore, the tapered surface 88 at the section where the annular portion 82 is connected to the claw portions 87 facilitates the insertion of the cap member 80 into the second opening end portion 22 of the sleeve 20. Furthermore, the tapered surface 88 can reduce the stress concentration imposed on the section where the annular portion 82 is connected to the claw portions 87 in inserting the cap member 80 into the sleeve 20. The pulley unit having the above-described configuration is suitable for the use in the alternator 90. However, the usage of the pulley unit is not limited to this, and the pulley unit is applicable to the whole of accessories in automobiles and the like.

As described above, the pulley unit in the present embodiment is not limited to the embodiment per se and may be practiced in various forms without departing from the gist of the present invention. For example, the present invention is applicable to a pulley unit that is not provided with a one-way clutch and sealing members although the present embodiment has exemplified one having these members. In the present embodiment, the configurations of the roller bearing and the ball bearing have been exemplified as the configuration in which the pulley is concentrically arranged on the radially outer side of the sleeve to be supported rotatably about the sleeve axis. The configuration of the roller bearing may be replaced by a ball bearing, while the configuration of the ball bearing may be replaced by a roller bearing. Further, the configuration has been exemplified in which the outer peripheral surface of the sleeve and the inner peripheral surface of the pulley serve as the raceway grooves for rollers and balls. However, the ball bearing and the roller bearing may have their own outer rings and inner rings discretely and be interposed between the sleeve and the pulley.

By adopting the configuration described above, the present invention can provide a pulley unit having a cap member that reduces entry of water.

What is claimed is:

1. A pulley unit comprising:
a sleeve having a cylindrical shape, and including: on one side in an axial direction a first opening end portion for insertion of an end portion of a rotational shaft; and a second opening end portion provided on a side that is opposite from the first opening end portion and having, as an inner periphery, a polygonal inner peripheral portion with a polygonal cross-section;
a pulley that is concentrically arranged on a radially outer side of the sleeve to be supported rotatably about an axis and has an outer peripheral surface on which a belt is wound; and
a cap member having a cover portion covering the second opening end portion and claw portions that are engaged with a stepped attaching portion provided on an inner surface of the sleeve, wherein
the cap member has an annular portion extending from the cover portion in the axial direction and fitted into the polygonal inner peripheral portion,
the claw portions are formed to extend from the annular portion in the axial direction, and
a peripheral surface of the annular portion is provided with first plane portions facing a surface of the polygonal inner peripheral portion.

2. The pulley unit according to claim 1, wherein
the peripheral surface of the annular portion has second plane portions that adjoin the first plane portions and that are formed by bending radially inward the peripheral surface adjoining the first plane portions at boundaries with the first plane portions such that the second plane portions each extend in a direction that intersects a surface of the polygonal inner peripheral portion, and
the second plane portions are provided with at least one protrusion that extends radially outward from the second plane portion.

3. The pulley unit according to claim 2, wherein
on the peripheral surface of the annular portion, the first plane portions are provided at opposite ends of the second plane portions in a circumferential direction, and
the protrusion is provided at an area that is surrounded by the second plane portion and two imaginary planes extending along the first plane portions located at the opposite ends of the second plane portion.

4. The pulley unit according to claim 1, wherein
a thickness of the annular portion in a radial direction is larger than a thickness of the claw portions in a radial direction.

5. The pulley unit according to claim 2, wherein
a thickness of the annular portion in a radial direction is larger than a thickness of the claw portions in a radial direction.

6. The pulley unit according to claim 3, wherein
a thickness of the annular portion in a radial direction is larger than a thickness of the claw portions in a radial direction.

7. The pulley unit according to claim 4, wherein
a section connecting the claw portions with the annular portion of the cap member is provided with a tapered surface gently tilted radially outward as the section extends from the claw portions toward the annular portion.

8. The pulley unit according to claim 5, wherein
a section connecting the claw portions with the annular portion of the cap member is provided with a tapered surface gently tilted radially outward as the section extends from the claw portions toward the annular portion.

9. The pulley unit according to claim 6, wherein
a section connecting the claw portions with the annular portion of the cap member is provided with a tapered surface gently tilted radially outward as the section extends from the claw portions toward the annular portion.

10. An alternator comprising the pulley unit according to claim 1.

11. An alternator comprising the pulley unit according to claim 2.

12. An alternator comprising the pulley unit according to claim 3.

13. An alternator comprising the pulley unit according to claim 4.

14. An alternator comprising the pulley unit according to claim 5.

15. An alternator comprising the pulley unit according to claim 6.

16. An alternator comprising the pulley unit according to claim 7.

17. An alternator comprising the pulley unit according to claim 8.

18. An alternator comprising the pulley unit according to claim 9.

* * * * *